Dec. 6, 1955   R. W. KETCHLEDGE   2,726,074
ACCELERATION MEASURING SYSTEM
Original Filed Nov. 14, 1947
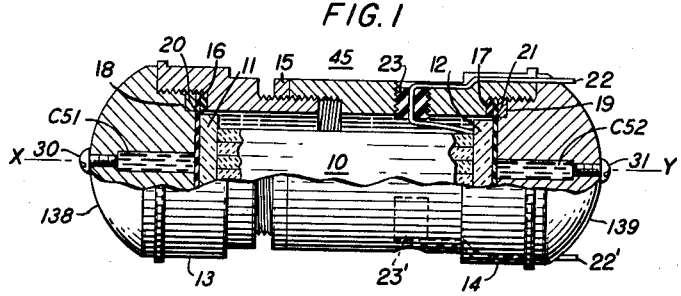
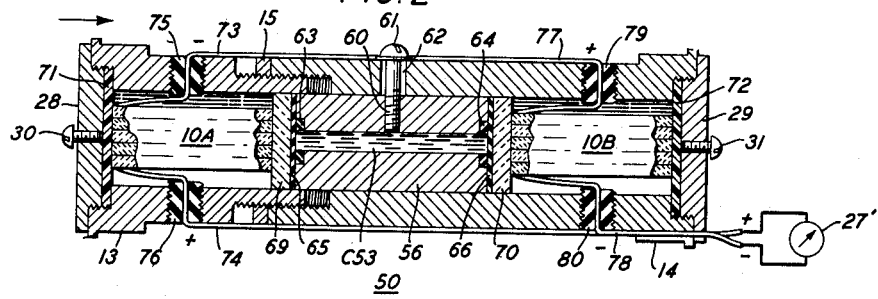
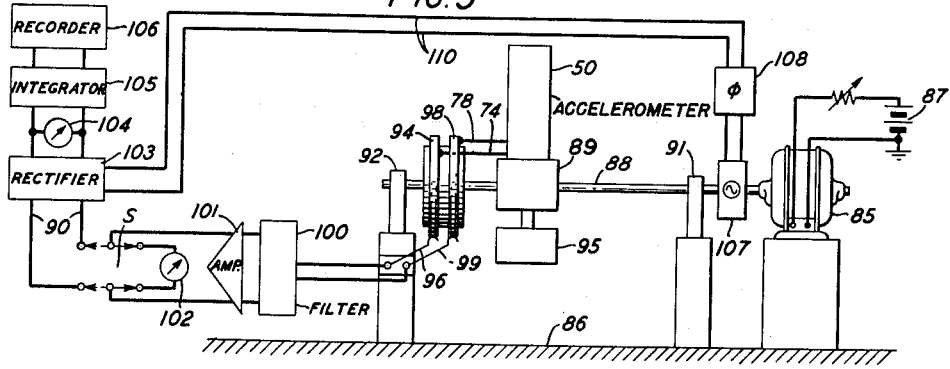
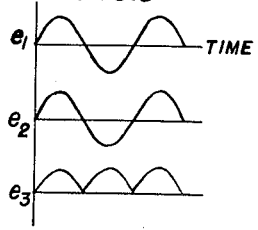
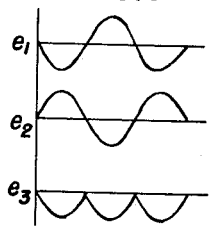
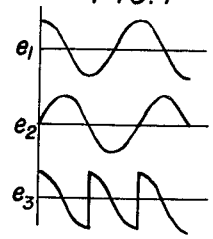
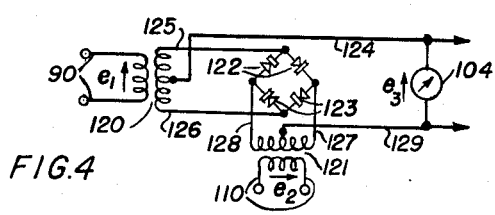
INVENTOR
R. W. KETCHLEDGE
BY
AGENT

United States Patent Office 2,726,074
Patented Dec. 6, 1955

2,726,074

ACCELERATION MEASURING SYSTEM

Raymond W. Ketchledge, Middlesex, N. J., assignor to Bell Telephone Laboratories, Incorporated, New York, N. Y., a corporation of New York Original application November 14, 1947, Serial No. 785,928, now Patent No. 2,650,991, dated September 1, 1953. Divided and this application May 19, 1950, Serial No. 162,920

5 Claims. (Cl. 264—1)

This application is a division of application, Serial No. 785,928, filed November 14, 1947, now Patent No. 2,650,-991, which discloses an improved accelerometer, one form of which may be employed to measure shock or acceleration along a specified direction and is thus designated a "line-responsive" accelerometer.

This invention relates to an improved system of apparatus for continuously determining the component in a given direction of the velocity attained by an object subjected to acceleration.

It is the object of this invention to provide a novel system of apparatus in which a line-responsive accelerometer may be employed to measure the component in a given direction of an acceleration.

A feature of the invention resides in the provision of apparatus including means for rotating a line-responsive accelerometer about an axis normal to a given direction at a desired frequency of rotation to obtain an alternating voltage of amplitude proportional to the component of acceleration parallel to the plane of rotation, of frequency equal to the frequency of rotation and of phase correspondent to a radial direction in the plane of rotation, in combination with means for comparing this voltage with a reference alternating voltage of constant amplitube, of frequency equal to the frequency of rotation of the accelerometer and of phase correspondent to a selected direction in the plane of rotation.

The invention will be understood from the following description with reference to the accompanying drawing in which:

Fig. 1 is a diagram of a "line-responsive" accelerometer;

Fig. 2 shows a line-responsive accelerometer distinguishing left from right shocks;

Fig. 3 diagrammatically represents an apparatus employing a line-responsive accelerometer;

Fig. 4 is a schematic of a phase-sensitive rectifier empolyed to compare the accelerometer voltage with a reference voltage of the same frequency but of fixed determinable phase;

Figs. 5, 6 and 7 are curves showing the relationships of the phase of the accelerometer voltage with respect to the reference voltage, the phase of the reference voltage in each case corresponding to a selected direction in the plane of rotation of the accelerometer.

Referring to Fig. 1, numeral 10 designates generally an array of piezoelectric crystals, described in greater detail in the parent application, by which a change in liquid pressure resulting from an acceleration is translated into an electrical voltage related to that change. To the array 10 are glued, one at each end thereof, the ceramic discs 11, 12. These, and other elements of the assembly, are housed in a cylindrical core made up of the two sleeves 13 and 14, sleeve 13 being externally threaded to be secured into internally threaded sleeve 14. An internally threaded clamping ring 15 preserves the desired lengthwise relationship of sleeves 13 and 14.

The internal surfaces of sleeves 13 and 14 are prolongations of each other, and smoothly fitting within them are the discs 11 and 12. The end portions of sleeves 13 and 14 are each internally cut out to leave a shoulder which is adjusted to be nearly flush with the outer face of the corresponding ceramic disc. The end portions so cut out are internally threaded so that neoprene gaskets 16 and 17, surrounding discs 11 and 12, respectively, may be assembled with their outer surfaces flush with the like faces of the discs, and held firmly so by clamping rings 18, 19. Between gasket 16 and clamping ring 18 is tightly held in a diaphragm 20 of stainless steel or rubber which is in firm contact with the outer face of disc 11; diaphragm 21 is similarly held between gasket 17 and ring 19 and in firm contact with the outer face of disc 12.

Leads 22, 22' are brought from crystal array 10 through holes in insulating plugs 23, 23' threaded into radial pole sleeve 14, thence via any desired path (for simplicity, notches) through sleeve 14 and plug 139 for connection to a measuring circuit.

While a piezoelectric crystal is preferred as the pressure-responsive element, other such elements may serve in the present invention. For example, use may be made of the magnetostriction of nickel, a permanently magnetized nickel tube may be held under slight initial lengthwise compression between discs 11 and 12 and surrounded by a coil terminating in leads 22, 22'. When the compression of the rod changes, a corresponding voltage is induced in the coil. Other pressure-sensitive elements will occur to those acquainted with the art.

The theory of operation of the instrument is based on the familiar fact that at the bottom of a column of liquid of height H and density P the hydrostatic pressure is PgH, where g is the acceleration of gravity. If such a column is subjected to any other acceleration G, the pressure becomes PGH, and this effect is produced in a horizontal column of length H exposed to a horizontal acceleration. In each case, the dimension in the direction of the acceleration determines the resulting pressure at the near end of the column in that direction; the bottom when the column is of height H and the acceleration overcomes gravity; the left end of a horizontal column of length H when the acceleration is directed to the right in a horizontal line.

In the line-responsive accelerometer 45, plugs 138 and 139 are hemispheres (or cylinders) seating snugly against diaphragms 20 and 21, respectively. Plugs 138 and 139 are solid except for lengthwise cylindrical bores of small diameter, $C_{51}$ and $C_{52}$, extending below closing screws 30 and 31 to the diaphragm surface. Cavities $C_{51}$ and $C_{52}$ are filled with mercury. Such an accelerometer responds to accelerations in the line X—Y without regard to whether shocks are from X toward Y or reversely. To make accelerometer 45 capable of distinguishing right from left shocks, $C_{51}$ (say) is left empty, diaphragm 20 is made rigid and an initial pressure is created in cavity $C_{52}$. A more sensitive device of this character is shown in Fig. 2.

The same principle, with appropriate departure in design, is applied in the discriminating line-responsive instrument diagrammed in Fig. 2, and generally designated by numeral 50.

Referring now to Fig. 2, the general form of the enclosing case is the same as that of the instrument shown in Fig. 1. In Fig. 2, however, a pair of crystal arrays 10A and 10B mounted internally and lengthwise of the sleeves 13 and 14, are separated by a lengthwise column of mercury, filling cavity $C_{53}$ in steel cylinder 56 which fits snugly within sleeves 13 and 14. Cylinder 56 is provided with a threaded filling hole 60, closed after filling with plug 61, and is inserted through hole 62 drilled radially through sleeve 14. Crystals 10A and 10B are similar in construction to crystal 10 of Fig. 1.

Cylinder 56 is turned internally at each end to receive the annular gaskets 63, 64. After assembly of the instrument, the end surfaces of cylinder 56 are flush with the outer surfaces of gaskets 63 and 64, and against these surfaces are provided rubber diaphragms 65 and 66, in contact as in the accelerometer of Fig. 1 with ceramic discs 69 and 70, respectively, through which the hydrostatic pressure in the liquid filling cavity $C_{53}$ is effective on the respectively adjacent ends of crystals 10A and 10B to which the ceramic discs are glued as before described. At their ends remote from the discs, the crystals are glued to discs 71, 72, say of plastic material, beyond which are end plugs 28 and 29. Plugs 28 and 29 are centrally tapped to receive screws 30 and 31, respectively, by means of which the crystals are given any desired initial compression after assembly of the instrument.

Leads 73, 74 for crystal 10A are taken through insulating bushings 75, 76 in sleeve 13; for crystal 10B, leads 77, 78 pass through similar bushings 79, 80. The assembly of the instrument is obvious and is here unnecessary to describe.

The crystals have been given an initial compression by means of screws 30, 31 and lead 73 is connected to lead 77, while leads 74 and 78 are connected each to one terminal of zero center meter 27'. The charge developed by the initial compression rapidly leaks away through meter 27'.

Let the crystals be each so poled that further lengthwise compression makes leads 74 and 77 positive and leads 73 and 78 negative. Reduction in lengthwise compression reverses these polarities in each case. Let it be assumed that a shock, in the direction of the arrow in Fig. 2, is applied to the accelerometer. The result will be an increased hydrostatic pressure at the left end of cavity $C_{53}$, a decrease in the pressure at the right end thereof. The piezoelectric effect then, with leads 73 and 77 connected as shown, is to develop two voltages in series across meter 27'. Lead 74, connected to the upper terminal of meter 27', is positive; lead 78, connected to the lower terminal of the meter, is negative.

Obviously, if the shock is oppositely directed, the voltage across meter 27' is reversed. The meter deflection is therefore in one direction for a shock from left to right, in the opposite direction for a right-to-left shock.

The sensitivity of the accelerometer is proportional to the depth of the mercury pool in the direction of the acceleration. With the design of Figs. 1 and 2, the pressure to which the crystal responds is that at the near end of the mercury column rather than the average pressure from end to end. Thus, with a 2.5-inch length for cavity $C_{53}$ of Fig. 2, about 5 volts/g would be obtained. One-millionth $g$, or one-thousandth of a centimeter per second squared, would provide 5 microvolts, a quantity readily amplified for convenient measurement. The application of the invention to the accurate measurement of gravity is possible on land, at sea or in the air, whereever a stable platform is available; for sea and air work, gyroscopic stabilization is disclosed, for example, in Patents 2,014,825, September 17, 1935, to J. P. Watson, and 1,840,104, January 5, 1932, to H. Anschütz-Kaempfe.

Referring to Fig. 3, a system of apparatus for the measurement of gravity is schematically shown. Motor 85, supported on stable platform 86, is supplied with power from a source symbolized by battery 87 and rotates shaft 88 in bearings supported parallel to platform 86 by pillars 91 and 92. Between pillars 91 and 92, shaft 88 carries drum 89 which supports, at right angles to shaft 88, accelerometer 50 of Fig. 2 and counterweight 95. Slip rings 94 and 98, insulated from each other and from shaft 88, are mounted on the shaft at any convenient position and to them are connected, respectively, leads 74 and 78 from accelerometer 50.

It will be readily understood that the centrifugal force on the accelerometer is constant and gives rise to a steady voltage between leads 74, 78 which rapidly vanishes. However, downward acceleration of gravity in one vertical position of accelerometer 50 is productive of an additional piezoelectric voltage which reverses sign when the accelerometer reaches the opposite vertical position. If $\rho$ is the density of mercury, $l$ the length of the mercury-filled cavity $C_{53}$ and $f$ the angular speed of shaft 88 in revolutions per second, there appears between leads 74, 78 an alternating voltage proportional to $\rho g l \sin 2\pi f t$, of phase dependent on the sense of rotation of shaft 88.

Making contact with slip rings 94, 98 are brushes 96, 99 respectively, which are connected to electrical filter 100 which is preferably tuned to the rotation frequency to include extraneous signals, providing at its output only $\rho g l \sin 2\pi f t$, the generated alternating voltage. This output voltage, amplified by amplifier 101, is by switch S applied either to meter 102 or by leads 90 to rectifier 103.

The alternating voltage between leads 74, 78 is proportional in amplitude to the acceleration to be measured, but is of phase dependent upon the radial direction of the acceleration; the amplitude is the same whatever this radial direction, so the apparatus of Fig. 3 so far described is plane-responsive. To confine its response to a prescribed direction in the plane of rotation of accelerometer 50, it is necessary to compare the output voltage from amplifier 101 with a reference voltage of the same frequency but of fixed determinable phase.

Rectifier 103 must therefore by a phase-sensitive device, an example of such being the circuit disclosed in my United States Patent 2,434,273 granted January 13, 1948. The accelerometer voltage between leads 90 is compared in rectifier 103 with a reference voltage of the same frequency derived from generator 107 driven by shaft 88 and impressed through phase shifter 108 on rectifier 103 via leads 110. Generator 107 is of conventional design, and generates a voltage of fixed phase and of amplitude large compared with the accelerometer voltage. Phase shifter 108 is preferably of the type disclosed by H. Nyquist in Patent 1,717,400, granted June 18, 1929; it permits rotation, through any desired angle, of the phase of the voltage from generator 107. Both my patent above referred to and the patent to Nyquist are assigned to the same assignee as the present invention.

The operation of rectifier 103 will be more clearly understood by reference to Figs. 4, 5, 6 and 7. The signal voltage is a sine wave whose magnitude and phase are due respectively to the magnitude and direction of the acceleration. The function of the phase sensitive rectifier is to determine the component of acceleration in a particular direction, that direction being determined by the phase of the reference voltage.

As shown on Fig. 4, the signal voltage on leads 90 is applied to transformer 120 which has a center tapped secondary. Thus the voltage from lead 124 to lead 125 is equal and opposite to that from lead 124 to lead 126. Likewise, the reference voltage on leads 110 is applied to a similar transformer 121 whose center tapped secondary is used to supply voltage to diodes 122 and 123. These diodes may be either vacuum tube or semiconductor diodes. The reference wave is made large compared to the signal wave so that the conduction or non-conduction of the diodes 122, 123 is controlled principally by the reference wave. Thus for one instantaneous polarity of the reference wave, say lead 127 positive to lead 128, diodes 123 will conduct and diodes 122 will be biased to non-conduction. This action connects lead 126 to leads 127 and 128 via diodes 123. Lead 129 is a center tap on the secondary on transformer 121 and thus the impedance of lead 129 to the combination of leads 127 and 128 is low. This is due to the cancelation of voltage drops in the two halves in the secondary of transformer 121. Thus, for this polarity of the reference wave, output lead 129 is effectively connected to lead 126.

On the opposite half-cycle of the reference wave lead 128 is positive with respect to lead 127. Diodes 122 conduct to thereby connect lead 129 to lead 125. It can be seen that the action of diodes 122, 123 is like that of a single pole, double-throw switch in which lead 129 is alternately connected to leads 125 or 126 under the control of the reference wave polarity.

Figs. 5, 6 and 7 show three conditions of signal wave phase with respect to the reference wave phase. In Fig. 5 the signal is in phase with the reference wave and the switching action serves only to invert the polarity of the negative excursions of the signal wave. The output wave is, therefore, like that of a conventional full-wave rectifier and contains a direct-current component proportional to the amplitude of the signal wave.

In Fig. 6 the signal wave is reversed in polarity or has a 180-degree phase with respect to the reference wave. Here it is the positive cycles of the signal that occur at the time the switching action inverts the polarity. Consequenly, the output signal is the same as before except that the output polarity is negative.

In Fig. 7 a 90-degree phase difference between the signal and reference waves is shown. Here the switching action occurs at the signal peaks rather than the signal zeros and the output wave has a zero direct-current component. It can readily be shown that the direct-current component of the output wave is proportional to the magnitude of the signal wave times the cosine of the phase difference between the signal and reference waves. Thus, if the signal wave magnitude represents magnitude of acceleraiton and if its phase angle represents direction of acceleration, then the direct-current output of phase sensitive rectifier 103 represents the vector component of acceleration in the direction represented by the phase of the reference wave.

Phase shifter 108 may be adjusted to make the phase of the voltage on leads 110 correspond with any desired radius in the plane of rotation of accelerometer 50. There results at the output of rectifier 103 a unidirectional voltage proportional exclusively to the acceleration component along the selected radius and of polarity corresponding to the sense of the acceleration in that direction.

The adjustment of phase shifter 108 thus makes the system of Fig. 3 line-responsive in any desired direction lying in the plane perpendicular to the axis of shaft 88.

When gravity is the quantity to be measured, its direction is known beforehand to be downward and the phase of the alternating voltage is immaterial. Therefore, meter 102 may be a conventional alternating current voltmeter.

It should be recognized that platform 86, shown horizontal in Fig. 3, may be vertical as well. If shaft 88 is mounted to rotate in a vertical position, and the sense of rotation is fixed, the apparatus of Fig. 3 is adapted to measure the horizontal acceleration of a vessel carrying it. For this purpose, switch S is thrown to supply the output voltage of amplifier 101 to rectifier 103. The output voltage of rectifier 103 may be read, if desired, on direct current voltmeter 104; it is positive, say, for acceleration forward, negative for the reverse acceleration. Obviously, this rectified output voltage may be applied to an integrating circuit 105. Circuit 105 may, for example, be an RC circuit such as is shown in Patent 2,099,536, November 16, 1937, to S. A. Scherbatskoy et al.; it delivers to recorder 106 a voltage proportional to the time integral of the voltage output from accelerometer 50, and so proportional to the time integral of the acceleration, i. e., to the horizontal velocity of the vessel.

The combination of a plurality of such apparatus as shown in Fig. 3, with shafts rotating about mutually perpendicular axes, of course permits the determination of the corresponding velocity components. Accelerometer 45 of Fig. 1, modified as described for left-right discrimination, may replace accelerometer 50 in the system of Fig. 3.

In accelerometers herein described, an initial hydrostatic pressure in the mercury produces a momentary voltage which rapidly vanishes if the instrument is undisturbed. Thus the voltage appearing in response to an acceleration is a function of the increment of hydrostatic pressure produced by the acceleration.

What is claimed is:

1. Apparatus for measuring the component in a given direction of an acceleration comprising a line-responsive accelerometer including an electrical generator developing a voltage responsively to an acceleration, means for rotating the accelerometer at a desired frequency of rotation about an axis normal to the given direction, said rotating means including means for supporting the accelerometer remotely from the axis with its line of response normal thereto whereby the generator develops an alternating voltage of amplitude proportional to the component of the acceleration parallel to the plane of rotation, of phase correspondent to the radial direction in that plane of said component and of frequency equal to the frequency of rotation, means controlled by the rotating means for generating a reference alternating voltage of constant amplitude and phase and of frequency equal to the frequency of rotation of the accelerometer, phase-shifting means for deriving from the reference voltage an alternating voltage of phase correspondent to the given direction, a phase sensitive rectifier for comparing the last-named voltage with the voltage developed by the accelerometer, thereby deriving a unidirectional voltage proportional to the component of the acceleration in a given direction, and means for measuring the unidirectional voltage.

2. A system of apparatus for continuously determining the component in a given direction of the velocity attained by an object subjected to acceleration comprising apparatus as in claim 1 for deriving a unidirectional voltage continuously proportional to the component of the acceleration in the given direction, means for integrating with respect to time said voltage and means for continuously recording the magnitude of the integrated voltage.

3. A device of the class described for the detection and measurement of external forces, comprising a casing, at least one inertia-type sensing couple in said casing and sensitive to accelerations in a predetermined geometrical direction with respect thereto, means mounting said couple in said casing for rotation about an axis different from said direction, power means for rotating said sensing couple at a predetermined speed about said axis, and means for continuously measuring the output of said couple during its rotation.

4. The device according to claim 3, wherein the sensing couple includes an inertia element mounted between a pair of piezoelectric crystals.

5. The device according to claim 3, wherein the sensing couple includes an inertia element mounted between a pair of magnetostrictive elements.

References Cited in the file of this patent

UNITED STATES PATENTS

| 636,844 | Reed | Nov. 14, 1899 |
|---|---|---|
| 2,319,940 | Manison | May 25, 1943 |
| 2,359,158 | Rushing et al. | Sept. 26, 1944 |
| 2,371,626 | Kecskemeti | Mar. 20, 1945 |
| 2,513,340 | Lyman | July 4, 1950 |
| 2,554,512 | Varian | May 29, 1951 |
| 2,648,055 | Smith | Aug. 4, 1953 |

FOREIGN PATENTS

| 719,762 | France | Feb. 10, 1932 |